(12) United States Patent
Brandwine et al.

(10) Patent No.: US 9,569,232 B1
(45) Date of Patent: Feb. 14, 2017

(54) NETWORK TRAFFIC DATA IN VIRTUALIZED ENVIRONMENTS

(71) Applicant: Amazon Technologies, Inc., Reno, NV (US)

(72) Inventors: Eric Jason Brandwine, Haymarket, VA (US); Aaron Douglas Dokey, Seattle, WA (US); Ajith Jayamohan, Redmond, WA (US); Ian Roger Searle, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 337 days.

(21) Appl. No.: 13/770,145

(22) Filed: Feb. 19, 2013

(51) Int. Cl.
*G06F 9/455* (2006.01)
*G06F 12/14* (2006.01)
*H04L 29/06* (2006.01)
*H04L 12/26* (2006.01)
*H04L 12/851* (2013.01)
*H04L 12/06* (2006.01)

(52) U.S. Cl.
CPC .......... *G06F 9/455* (2013.01); *G06F 9/45533* (2013.01); *G06F 12/14* (2013.01); *H04L 29/06877* (2013.01); *H04L 43/026* (2013.01); *H04L 43/04* (2013.01); *H04L 43/16* (2013.01); *H04L 47/2441* (2013.01); *H04L 63/14* (2013.01); *H04L 63/1425* (2013.01)

(58) Field of Classification Search
CPC ...... G06F 12/14; G06F 9/455; G06F 9/45533; H04L 29/06877; H04L 43/04; H04L 43/16; H04L 63/14; H04L 43/026; H04L 47/2441; H04L 63/1425

USPC .............................................................. 718/1
See application file for complete search history.

(56) References Cited

U.S. PATENT DOCUMENTS

| 7,363,382 | B1 * | 4/2008 | Bakke | G06F 11/201 370/216 |
| 8,707,417 | B1 * | 4/2014 | Liang | G06F 9/45558 726/11 |
| 2004/0114518 | A1 * | 6/2004 | MacFaden et al. | 370/230.1 |
| 2008/0232269 | A1 * | 9/2008 | Tatman et al. | 370/252 |
| 2009/0168648 | A1 * | 7/2009 | Labovitz | H04L 12/2602 370/229 |
| 2010/0027420 | A1 * | 2/2010 | Smith | 370/235 |
| 2010/0241607 | A1 * | 9/2010 | Fujioka | G06F 11/008 706/52 |

(Continued)

OTHER PUBLICATIONS

Cisco Systems, "Customizing Flexible NetFlow Flow Records and Flow Monitor", Nov. 29, 2012, 19 pages.*

(Continued)

*Primary Examiner* — Brian J Gillis
*Assistant Examiner* — Amy Ling
(74) *Attorney, Agent, or Firm* — Hogan Lovells US LLP

(57) ABSTRACT

Approaches are described for collecting and/or utilizing network traffic information, such as network flow data, within a virtualized computing environment. The network traffic information can be collected on one or more host computing devices that host virtual machines. The collected network traffic information can include virtualized computing environment specific information, such as a user account identifier (ID), virtual machine identifier (ID), session termination information and the like. The collected network traffic information can also be presented to the user of the virtualized computing environment.

29 Claims, 8 Drawing Sheets

(56) References Cited

U.S. PATENT DOCUMENTS

| | | | |
|---|---|---|---|
| 2013/0114612 A1* | 5/2013 | Singh et al. | 370/401 |
| 2013/0167047 A1* | 6/2013 | Pujari | G06Q 40/02 715/762 |
| 2014/0136707 A1* | 5/2014 | Beaty | H04L 67/1097 709/226 |
| 2014/0198648 A1* | 7/2014 | Kulkarni | H04L 47/2441 370/235 |
| 2014/0331309 A1* | 11/2014 | Spiers | H04L 63/0218 726/12 |

OTHER PUBLICATIONS

Rfc3917, "Requirements for IP Flow Information Export (IPFIX)", Oct. 2004, Network Working Group, 33 pages.*

Cisco, "Introduction to Cisco IOS NetFlow, White Paper", May 2012, Cisco Systems, Inc., 16 pages.*

\* cited by examiner

NETWORK TRAFFIC DATA IN VIRTUALIZED ENVIRONMENTS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances that are associated with (e.g., owned by) a particular user (e.g., customer). This can enable various users to run their applications remotely, using on the resources of the cloud computing provider. However, providing a conventional virtual computing environment has a number of limitations. For example, users are often not provided the same level of control and visibility in the virtual resources allocated to them as they would have if the user physically owned those resources. In some cases, a user may wish to know more detailed information about their virtual resources or network traffic flowing through their virtual resources.

BRIEF DESCRIPTION OF THE DRAWINGS

Various embodiments in accordance with the present disclosure will be described with reference to the drawings, in which.

DETAILED DESCRIPTION

Figure 1:
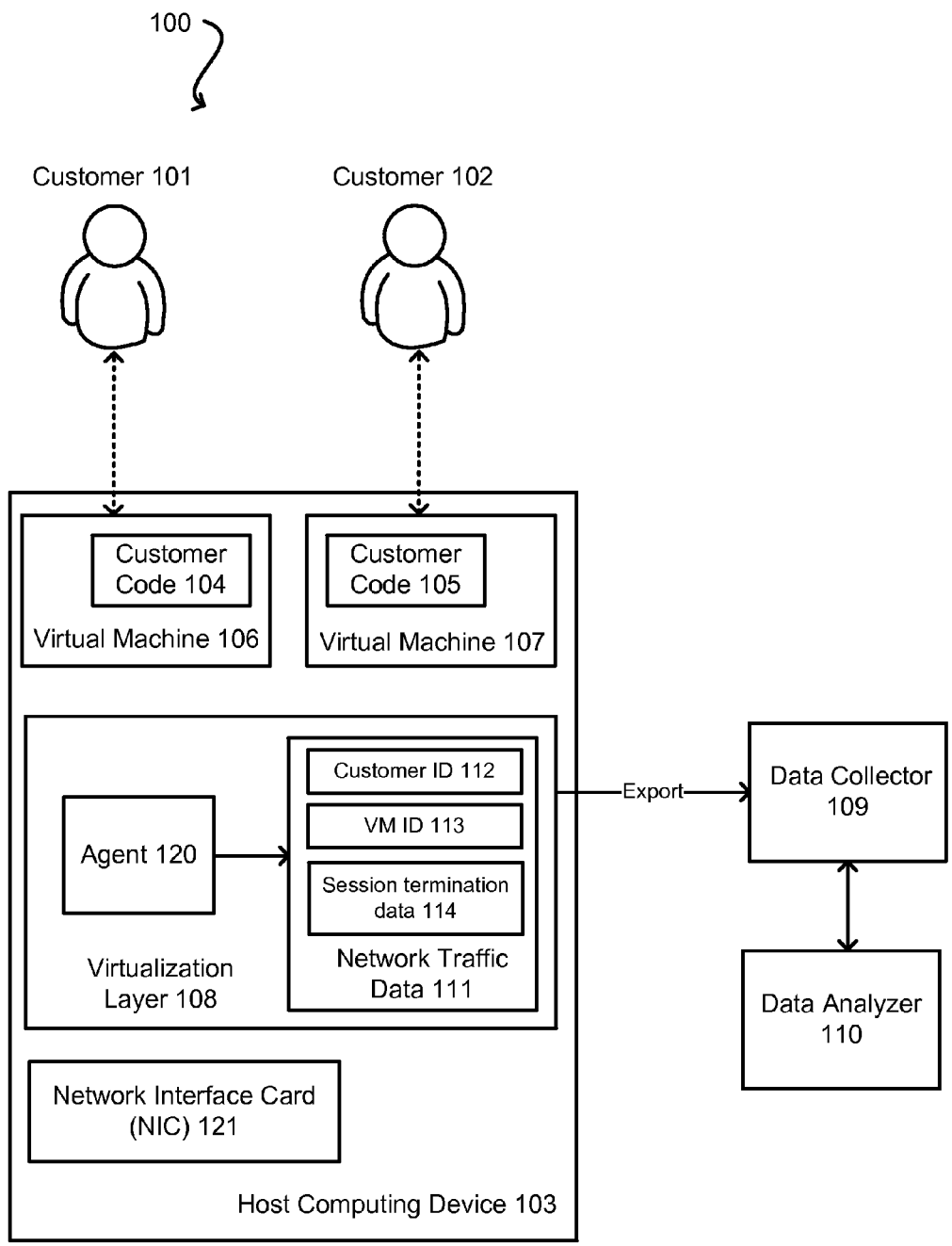
FIG. 1 illustrates an example of network traffic data being collected on a host computing device, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for collecting and/or processing information in a computing environment. In particular, various embodiments provide approaches for collecting and/or utilizing network traffic information, such as network flow (e.g. Netflow) data, within a virtualized computing environment. The network traffic data can be collected on one or more host computing devices that host virtual machines. In various embodiments, the collected network traffic data (e.g., network flow data) can include service provider specific information (i.e., information specific to the multitenant virtualized computing environment), such as a customer account identifier (ID), virtual machine identifier (ID), session termination information and the like. The collected network traffic data can be analyzed by executing one or more queries that may identify misconfigured resources, malicious users or the like. In some embodiments, the collected network traffic data is exposed to users of the virtual machines via one or more application programming interfaces (APIs).

In various embodiments, Internet Protocol (IP) and other network traffic related information collected on a network is often referred to as network traffic data or network flow data (e.g., Netflow). A network device, such as a router or switch, gathers network traffic data (e.g., Netflow data) and exports it to a network data collector. The collected network traffic data can be analyzed to detect various issues on the network, such as misconfigurations of various devices and the like. Network traffic data can be organized as one or more records, where each record defines a flow. A flow can be a unidirectional sequence of packets that share certain common data values (e.g., source IP address, destination IP address, IP protocol, etc.).

In accordance with various embodiments described herein, network traffic information, such as Netflow data, can be collected and utilized within the context of a virtualized computing environment, such as a multitenant public or private cloud. In this type of environment, an operator of the virtualized computing environment may provide access to physical resources, such as host computing devices, to its customers and allow the customers to execute their programs using the physical resources of the service provider. For example, each host computing device can include a virtualization layer (e.g., a hypervisor in combination with a privileged domain) that hosts one or more guest virtual machines. Each virtual machine can be owned by a particular user and can execute a service or application using the physical resources (i.e., host computing device) of the virtualized computing environment. The user can access and manage their resources via APIs and other management tools.

In accordance with an embodiment, the virtualized computing environment provider (e.g., service provider) collects network traffic data on the host computing device. The network traffic data can include at least one record for each defined flow of network packets transmitted by a virtual machine or received by a virtual machine on the host computing device. In one embodiment, the network traffic data is collected by an agent that is implemented in the virtualization layer of the host computing device (e.g., in a privileged domain).

In an example embodiment, the collected network traffic data can include information about the virtualized computing environment (e.g., service provider specific information). For example, the network traffic data can include, but is not limited to: a customer account identifier (ID) assigned to the customer that owns the virtual machine instance executing on the host computing device; a virtual machine ID of the virtual machine instance that was involved in the network flow; and/or session termination information, such as the reason for termination of a particular flow. Because this type of information is known in the virtualized environment, rather than simply identifying a flow by an IP address, the service provider has information that the IP address corresponds to a particular virtual machine instance and/or a particular customer. In addition to the information specific to the virtualized environment, the network traffic data can also include (but is not limited to): the input interface index used by the simple network management protocol (SNMP) (ifIndex in IF-MIB); the output interface index (or zero if the packet is dropped); the timestamps for the flow start and finish time (e.g., in milliseconds) since the last boot; the number of bytes and packets observed in the flow; and the Layer 3 headers such as the source and destination IP addresses; source and destination port numbers for TCP, UDP, SCTP; ICMP Type and Code; IP protocol; and Type of Service (ToS) value. For TCP flows, the network traffic data may also include the union of all transfer control protocol (TCP) flags observed over the life of the flow. Additionally, the network traffic data may include Layer 3 Routing information, such as the IP address of the immediate next-hop along the route to the destination; and the source and destination IP masks.

Once the network traffic data is collected, it can be stored in a data structure on the host computing device. For example, the network traffic data can be stored in a state tracking table managed in the hypervisor or virtual machine manager of the host computing device. In addition, the network traffic data can be exported from the host computing device to a network data collector that is external with respect to the host computing device. The exporting of the network traffic data can be performed periodically, or in response to determining that a particular flow has terminated. Once exported, the network traffic data can be analyzed to detect various misconfigurations of various components, malicious agents that may be attacking the network and the like. For example, one or more queries can be executed based on the network traffic data, such as a query to identify all systems that a virtual machine has communicated with over a particular time interval or the like. Additionally, the network traffic data can be used to detect misbehaviors and malicious external users, such as an external device on the Internet that may be contacting many host computing devices (addresses) on the service provider's network.

In some embodiments, the collected network traffic data (or some derivative of that data) can be presented to the customer by the service provider. For example, the service provider can expose an application program interface (API) that can be used by a customer to send web service requests to the service provider for network traffic data and the service provider can provide the network traffic data to the customer in response. In an embodiment, the network traffic data can be presented to the customer to appear as if it was collected by a network router device that is not actually present. In one embodiment, the network traffic data is exposed to customers that have a virtual network hosted by the service provider that comprises multiple virtual machines. For example, a customer of the service provider can provision a private, isolated group of compute nodes in a virtual network. The customer can specify the network topology of the virtual network as well as set the IP address ranges used by the compute nodes, create subnets, and configuration of route tables and network gateways. In an embodiment, the virtual network can include a virtual router or virtual switch that collects the network traffic data. When the customer wishes to obtain access to the network traffic data, they can invoke an API call to start collecting the data. The data is then collected by agents residing on the host computing devices that host the virtual network; filtered such that only data relevant to the customer's virtual network is extracted; and stored in a designated location accessible by the customer. As such, the network traffic data is retrieved from the host computing devices but the data is synthesized and presented as if a virtual router in the middle of the virtual network was performing the collection. The customer can be enabled to configure the network traffic data collection on the virtual router, and the data records can include information associated with the traffic going through the virtual router.

FIG. 1 illustrates an example 100 of network traffic data being collected on a host computing device, in accordance with various embodiments. As illustrated, a host computing device 101 can include a virtualization layer 108 that hosts one or more guest virtual machines (106, 107). In one embodiment, the virtualization layer is comprised of a hypervisor operating in combination with a privileged domain, such as domain-0 (DOM-0). The privileged DOM-0 can effect a number of guests, such as the virtual machines. In another embodiment, the virtualization layer can be comprised of a virtual machine manager (VMM) that combines the functions of the hypervisor and DOM-0. Each virtual machine can be an independent guest operating system, having its own kernel and drivers, capable of executing code (104, 105) provided by one or more customers (101, 102).

In the illustrated embodiment, an agent 120 operating on the host computing device 101 that hosts the virtual machines (106, 107) can collect network traffic data 111. In this figure, the agent 120 is shown as residing in the virtualization layer 108, however, in alternative embodiments, the agent can reside in other components on the host computing device 101. Network traffic data 111 can include any information related to network traffic being transmitted by or received by the virtual machines (106, 107) and the customer-provided code (104, 105) operating thereon. In one embodiment, the network traffic data includes one or more records, where each record captures information about a flow of packets. In some embodiments, the network traffic data 111 can be gathered in the virtualization layer (e.g., in state tracking tables and IP tables) of the host computing device 101. In other embodiments, the network traffic data 111 can be collected by a network interface card (NIC) 121 that includes a memory and a processor configured to perform processing related to network operations.

Because the network traffic data collection is performed in a multitenant virtualized computing environment, there is additional and useful information that can be gathered by the service provider (or other operator of the environment). For example, on a conventional router, packets are viewed as somewhat isolated events where the router performs state tracking and turns these isolated events into a flow. From the point of a view of a router, the stream of packets are related, however, the amount of information about these packets, their destinations and sources, and their purpose is limited. In a host computing device 101 within a multitenant virtualized environment, however, there is more information that can be obtained as part of collecting the network traffic data 111. For example, rather than simply knowing an IP address, the service provider has information that the IP address corresponds to a particular virtual machine instance and/or a particular customer account. Thus, in the illustrated embodiment, the information specific to the virtualized computing environment can be added to the network data records, such as customer identifier (ID) 112 and virtual machine ID 113.

In addition, the network traffic data 111 can include session termination data 114 that provides information about the reason for termination of each traffic flow (e.g., sequence of packets, session, etc.), such as information about why the flow was permitted or denied. In various embodiments, each traffic flow continues until the flow is terminated. The flow can stop for a multitude of reasons. For example, the traffic flow may naturally be torn down, such as in the case of an aborted UDP or TCP connection. Alternatively, if the flow has not continued for an extended period of time, the flow can be shut down (i.e. declared dead) due to inactivity. In a multitenant virtualized computing environment, a traffic flow may also be stopped by a host-based firewall (e.g., security policy) while another traffic flow may pass through the firewall and be stopped by the virtual machine itself. Similarly, a traffic flow that is stopped by a host computing device 101 as a result of abuse mitigation is different from a flow stopped by a customer-configured firewall. All of this information can be captured as session termination data 114 that is added to the network traffic data records, which can be analyzed to attain more detailed knowledge about the traffic being processed by the host computing device.

In various alternative embodiments (not shown), the network traffic data 111 can also include information about a virtual interface identifier (ID) (e.g., an identifier for an network interface) attached to a virtual machine), an identifier for the virtual network that the flow relates to, one or more security groups that the traffic flow is related to, measured latency statistics for the traffic flows (e.g., a particular flow can be annotated with the roundtrip time and statistics thereof) and other information that is obtained by virtue of the network traffic data being collected in a multitenant virtualized environment.

Once the network traffic data 111 has been gathered and stored on the host computing device 101, it can be exported to a network data collector 109. The network data collector 109 can be any component external with respect to the host computing device 109, such as a centralized service executing on the network of the service provider, a remote computing device or the like. In one embodiment, each time a flow is terminated (e.g., completed, shut down, etc.), the network traffic data 111 for the flow is exported out of the host computing device 101 to the network data collector 109. In another embodiment, the network traffic data 111 for the flows that are still in process of being carried on can be periodically exported (i.e., prior to completion of the flows). In one embodiment, information specific to the virtualized computing environment (e.g., customer account ID 112, virtual machine ID 113, session termination data 114) can be added to the network traffic data 111 at the time of exporting the network traffic data 111 to the network data collector 109. In another embodiment, the service provider specific information can be added to the network traffic data 111 at the time of capturing the network traffic data and storing it on the host computing device 101.

Once the network traffic data 111 has been exported to the network data collector 109, it can be analyzed by a network data analyzer 110. Analyzing the network traffic data 111 can include executing one or more queries on the data. The information specific to the virtualized environment that has been added to the network traffic data 111 can be useful in this context, when running the queries. For example, the network data analyzer 110 may run queries such as "show all entities that this virtual machine has communicated with" or "show all systems that virtual machines belonging to customer 101 have communicated with in a particular time interval". Moreover, the network traffic data 111 can be used to detect misbehaviors and malicious external users that reside outside of the network of the service provider. For example, a random device on the Internet may be contacting large numbers of host computing devices on the service provider's network. In certain cases, this may be deemed normal if the addresses being contacted all belong to one customer or a few customers. However, if one external address has contacted a thousand different customers in a short time interval, it can be flagged as likely doing something malicious or otherwise undesirable. In various embodiments, the queries can also utilize the session termination information. For example, a query may request the number of host computing devices with a particular port closed did a particular IP address try to contact over a specified time interval.

In some embodiments, extending the network traffic data 111 with various types of information specific to the virtualized computing environment (e.g., service provider specific information) as described above can cause the collected data to grow substantially in size. This may introduce some issues with data management, particularly when exporting the data from the host computing device 101 to external components, such as network data collector 110. In at least some embodiments, hashing operations and other techniques may be performed to improve the data management associated with the increase in size of the network traffic data 111. Some examples of such hashing operations and other techniques are described in U.S. patent application Ser. No. 13/443,128, entitled, "SYSTEMS AND METHODS FOR PROCESSING REQUESTS FOR NETWORK RESOURCES" filed on Apr. 10, 2012, which is incorporated by reference herein in its entirety.

Figure 2:
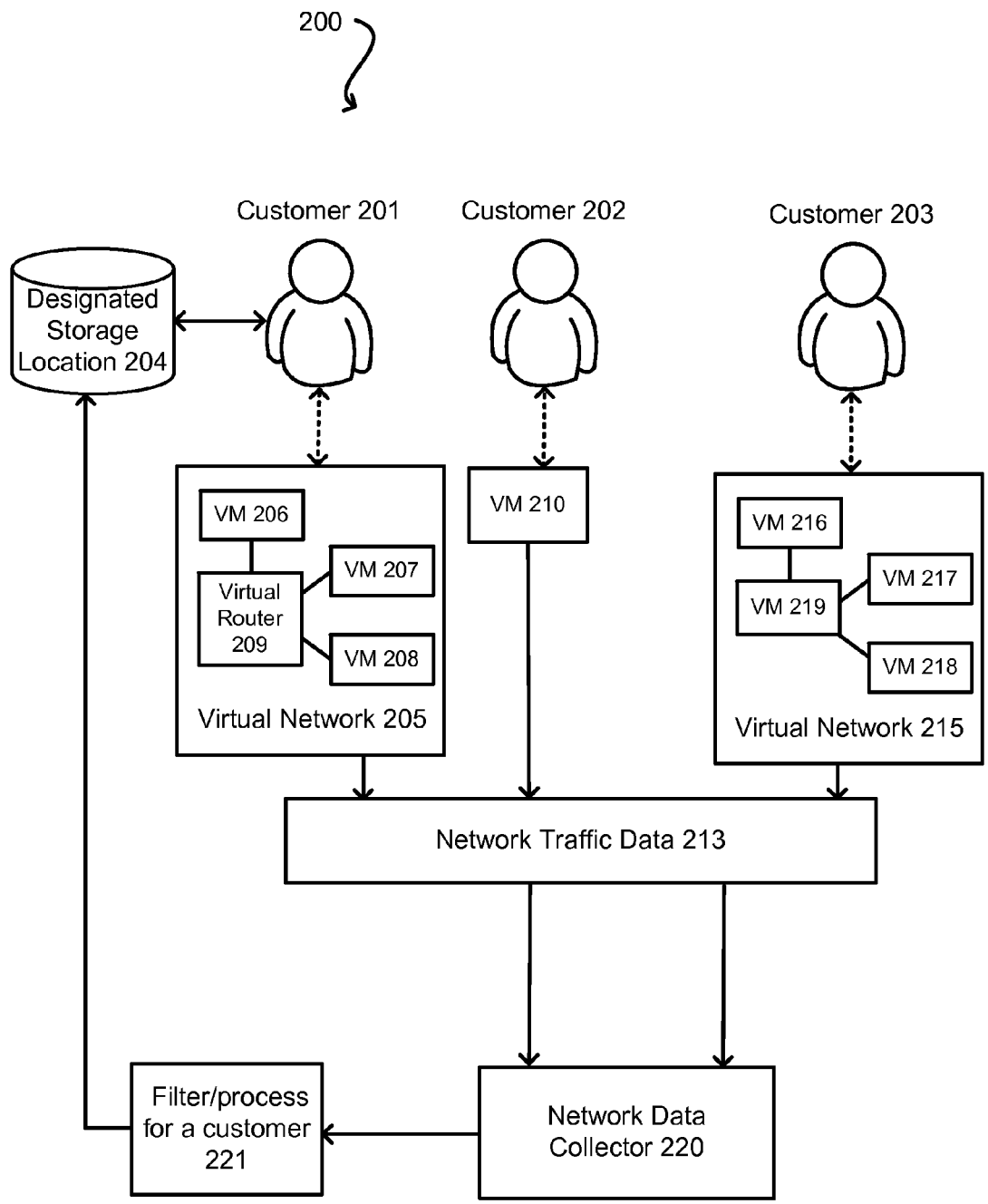
FIG. 2 illustrates an example of presenting the extended network traffic data to a customer, in accordance with various embodiments.

FIG. 2 illustrates an example 200 of presenting the extended network traffic data to a customer, in accordance with various embodiments. Once the network traffic data has been collected and exported, the network traffic data (or a derivative thereof) can be provided to one or more customers for access. In some embodiments, the network traffic data can be presented to customers having a virtual network comprised of a plurality of virtual machines, where the network traffic data is presented to the customer to appear as if it was collected by a virtual router or switch device on the virtual network. In various embodiments, a virtual network is a set of virtual machines defined by a customer and running on the host computing devices of a service provider. Virtual networks will be described in further detail with reference to FIG. 3B below.

As illustrated, the multitenant virtualized environment can include a plurality of virtual machine instances (206, 207, 208, 210, 216, 217, 218, 219) hosted by a service provider for a plurality of customers (201, 202, 203). Some of the customers, such as customer 201, can have a virtual network 205 of virtual machines (206, 207, 208) set up on the host computing devices of the service provider. Similarly another customer 203 may own another virtual network 215 comprised of multiple virtual machines (216, 217, 218, 219). Other customers, such as customer 202 may only have a single virtual machine 210 or several independent virtual machines (not shown).

In accordance with an embodiment, the host computing devices hosting the virtual machines collect network traffic data 213 being transmitted by the virtual machines executing on the host computing device. As previously described, the network traffic data 213 can include various information specific to the multitenant virtualized computing environment, such as information about the customer, virtual machine instance, and/or session termination information. The network traffic data 213 can be periodically exported to a network data collector 220.

In the illustrated embodiment, a customer, such as customer 201, can submit a request, such as an application programming interface (API) call, to request the collection of network traffic data for their virtual network 205. In one embodiment, the customer 201 calls the API to configure the network traffic data collection. This causes the service provider to start performing some processing 221 for the customer 201. In one embodiment, the processing 221 includes filtering the gathered data and storing it in a particular designated storage location 204. The customer 201 can then access the location 204 to see the collected data.

In various embodiments, all of the collected data records collected by the service provider on all host computing devices can include data for multiple customers, as well as specific information that may not be meaningful to the customer (e.g., DOM-0 information, etc.). As such, this form of network traffic data may not be suitable for vending to customers. Because of this, the network data collector 220 can filter the network traffic data collected on the host computing devices to produce a filtered subset of all of the collected network traffic data that is related to the virtual network 205 and the virtual machines (206, 207, 208) that belong to customer 201. The relevant subset of the network traffic data is then presented to the customer 201 by storing the data in a designated storage location 204 that is accessible by the customer 201. The customer can inspect the data, analyze it by running various queries, and the like. Furthermore, in one embodiment, because the network traffic data has been filtered, the customer 201 can only see the portion of network traffic data that is relevant to the resources (e.g., virtual machines, virtual network etc.) owned by customer 201 and would be blocked from seeing the network traffic data related to other customers (202, 203).

In one embodiment, the service for exposing the network traffic data is only provided to the customers that implement a virtual network. In other embodiments, the service for exposing the network traffic data can be made available to all customers of the service provider.

In accordance with an embodiment, the subset of relevant network traffic data is presented to the customer 201 to appear as if the data was collected by a virtual network router 209 that is connected to the customer's virtual network 205. In this embodiment, although a physical network router may not exist which corresponds to the virtual router 209 (e.g., the functionality of the router may be implemented within the host computer devices that host the virtual machines 206, 207, and 208), the network traffic data is synthesized in a format that corresponds to a format that would be used by a physical network router that would appear to be connected to the network. In this manner, customers can have access to the network traffic data in manner analogous to having an actual physical router or switch collecting the data on a physical network. In one embodiment, the network traffic data includes an interface identifier. When the service provider synthesizes the network traffic records for such a nonexistent router, it can use a subnet ID as the router interface name. For example, some of the fields in a network data record may include the ingress port and the egress port. These fields may be replaced with the virtual machine identifiers of the virtual machine from which the packets are being transmitted and the virtual machine receiving the packets. In various embodiments, some data formats are extensible (e.g., Internet Protocol Flow Information eXport (IPFIX)) and the data can be inserted in multiple or different existing or custom fields. In another example, the network traffic data can be aggregated into file corresponding to each host computing device (e.g., one file per hypervisor or virtual machine manager). These files can be combined together to construct one network traffic data record file corresponding to a virtual network of the customer, making the file appear as if it was collected by the virtual router, rather than an individual host computing device. Similarly, once the network traffic records have been aggregated in this manner, rather than requesting network traffic data corresponding to a particular virtual machine, the customer can obtain the network traffic data corresponding to a particular interface(s), a particular virtual network or availability zone, a particular port(s) on a particular virtual router and the like.

Figure 3A:
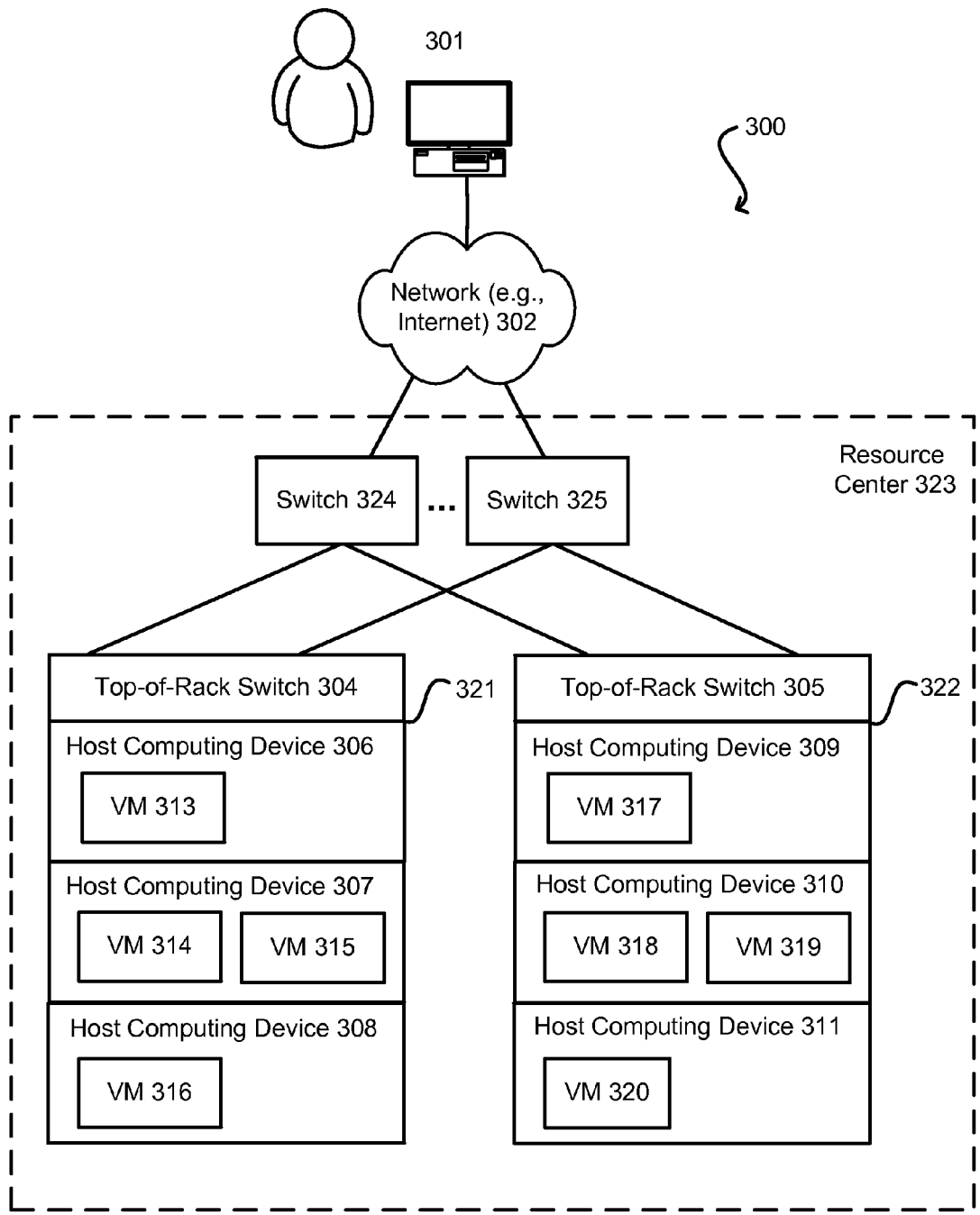
FIG. 3A illustrates an example of a resource center of a service provider that provides the physical resources that can be used to enable a multitenant virtualized computing environment, in accordance with various embodiments.

FIG. 3A illustrates an example 300 of a resource center of a service provider that provides the physical resources that can be used to enable a multitenant virtualized computing environment, in accordance with various embodiments. In the illustrated embodiment, a service provider (or other operator of the multitenant virtualized computing environment) can maintain one or more resource centers 323 (e.g., data centers, server farms, etc.) that store the physical resources (e.g., host computing devices, etc.) of the service provider. The resource centers may be located in different geographic locations to provide improved redundancy and failover, as well as more localized access to resources. The physical resources can be used to host a number of virtual machines or virtual servers that can be provided to users 301 over a network 302, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual networks and the like.

In the illustrated example, the resource center 323 of the service provider may include one or more racks 321, 322 of host computing devices (306, 307, 308, 309, 310) wherein each host computing device on a particular rack is connected to a single top-of-rack (TOR) switch (304, 305). These TOR switches can be further connected to one or more other switches (324, 325) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (313, 314, 315, 316, 317, 318, 319) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider. In various embodiments, the network traffic data collection can be performed in such a multitenant virtualized computing environment, as illustrated in FIG. 3A.

Figure 3B:
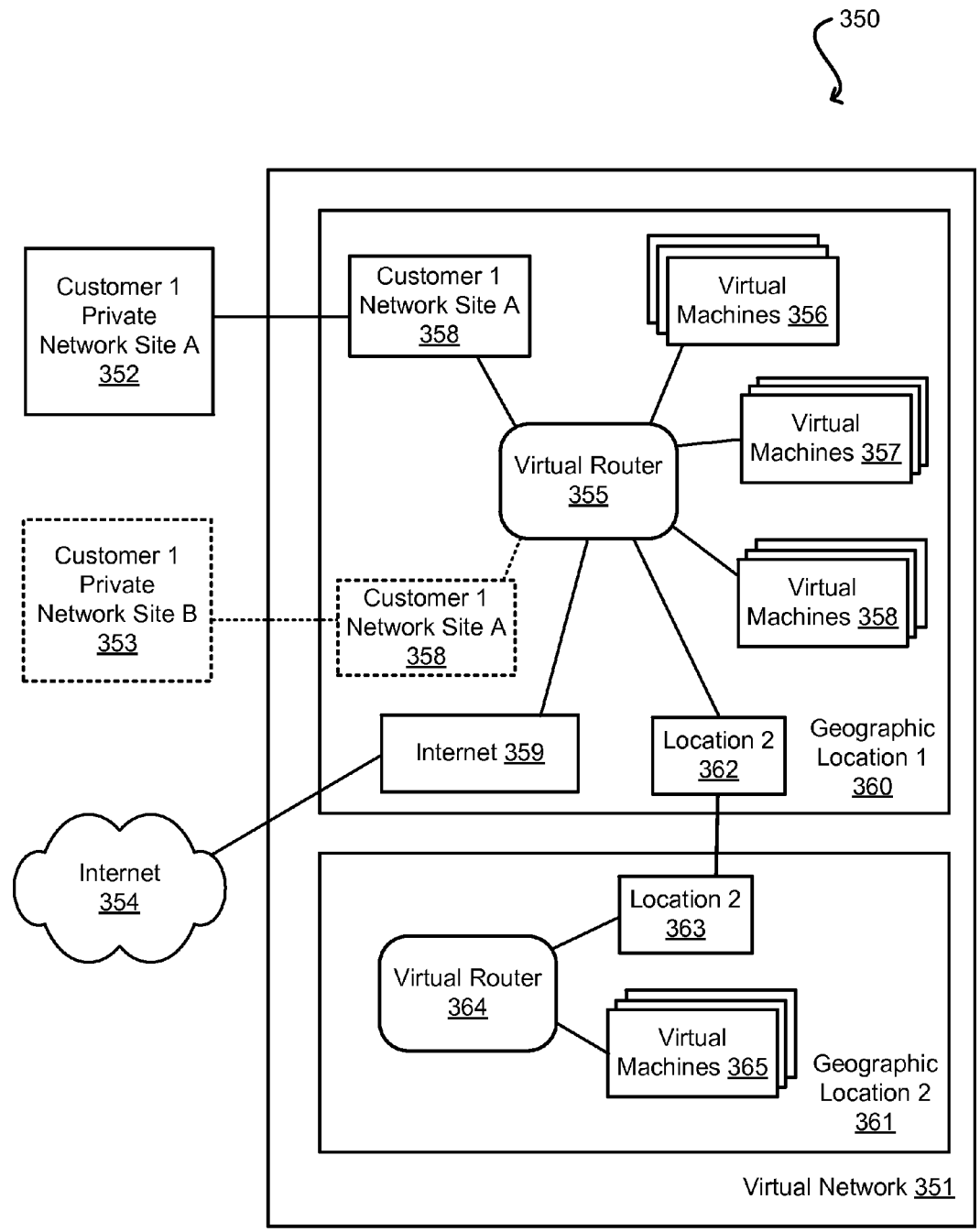
FIG. 3B illustrates an example of a virtual network that can be provided for a customer using the physical resources of a service provider, in accordance with various embodiments.

FIG. 3B illustrates an example 350 of a virtual network that can be provided for a customer using the physical resources of a service provider, in accordance with various embodiments. As previously mentioned, the service provider (or other operator of the virtualized computing environment) can provide a resource center that maintains the physical resources (e.g., host computing devices, etc.) to host the various virtual machines and virtual networks, such as virtual network 351, for one or more customers of the service provider. In some embodiments, the service provider may provide a network service that can be used to create and configure the virtual networks by various customers of the service provider.

In the illustrated example, the virtual network 351 is a private network extension to a remote private computer network of a customer. The virtual network 351 includes various virtual machines that are located at a first geographic location 1 360 (e.g., in a first data center located in the geographic location 1). The virtual machines can be configured into logical groups 357, 358, and 359 (e.g., to correspond to different subnets and associated networking devices not shown). In this example, a single conceptual virtual router 355 is shown in geographic location 1 360 to control communications between those virtual machines and other computing systems, so as to illustrate different types of communications that may occur, although in alternative embodiments, there may be multiple or no configured networking devices at geographic location 1. The virtual network may be implemented in geographic location 1 360 in various manners, such as via multiple physical interconnected routers or other networking devices, by using an underlying substrate network and associated modules that control communications over the underlying network, or the like. In this example, the virtual router 355 operates in accordance with the configured information for the virtual network 351, including configured network topology information, such as may be configured by the customer using the network service provided by the service provider.

In this example, the virtual network 351 is provided for example customer 1, and is a network extension to a remote computer network of client 1. Customer 1's remote computer network includes multiple computing systems (not shown) at a first remote location, such as Private Network Site A 352, and the virtual router 355 is configured to communicate with those multiple computing systems via a virtual communication link 358. For example, the virtual network may include one or more configured virtual private network (VPN) connections to the multiple computing systems at Site A 352, and the communication link 358 may correspond to one or more such VPN connections. In addition, the remote computer network of customer 1 may optionally include computing systems at one or more other locations, such as the illustrated optional Private Network Site B 353, and if so, the virtual router 355 may further be configured to communicate with those other computing systems at the other locations, such as via an optional virtual communication link 358 to Site B 353 (e.g., via one or more other configured VPN connections directly to Site B). When multiple VPN connections or other secure connections are used to remote computing systems of a remote computer network, each connection may correspond to a subset of the remote computing systems (e.g., by being associated with a subset of the network addresses of the remote computer network that correspond to those computing systems) so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Further, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the virtual network 351 may be configured to allow all, some or no communications between the virtual machines of the virtual network and other external computing systems that are generally accessible on the Internet 354 or other public networks. If at least some such external communications are allowed, the virtual router 355 may further be configured to communicate with those external multiple computing systems via an optional virtual communication link 359.

In the illustrated embodiment, in addition to the virtual machines (356, 357, 358) at geographic location 1 360, the virtual network may further include virtual machines 365 that are located at a second geographic location 2 361 (e.g., at a distinct second resource center at the geographic location 2). Accordingly, the virtual router 355 may be configured to include a virtual communication link 362 to the portion of the virtual network at the geographic location 2 361. In this example, the portion of the virtual network at the geographic location 2 361 similarly is illustrated with a conceptual virtual router 364 to manage communications to and from the virtual machines 365, including to communicate with the portion of the virtual network at the geographic location 1 360 via a virtual communication link 363. Such communications between virtual machines of the virtual network at different geographic locations may be handled in various manners in various embodiments, such as by sending the communications over the Internet or other public networks (e.g., as part of a secure tunnel using encryption) by sending the communications in a private secure manner (e.g., via a dedicated lease line between the geographic locations), etc. In addition, while not illustrated here, the portion of the virtual network at the geographic location 2 may similarly include other virtual communication links, such as to remote client private networks (e.g., via one or more VPN connections distinct from any VPN connections to the geographic location 1), to the Internet, etc.

Figure 4:
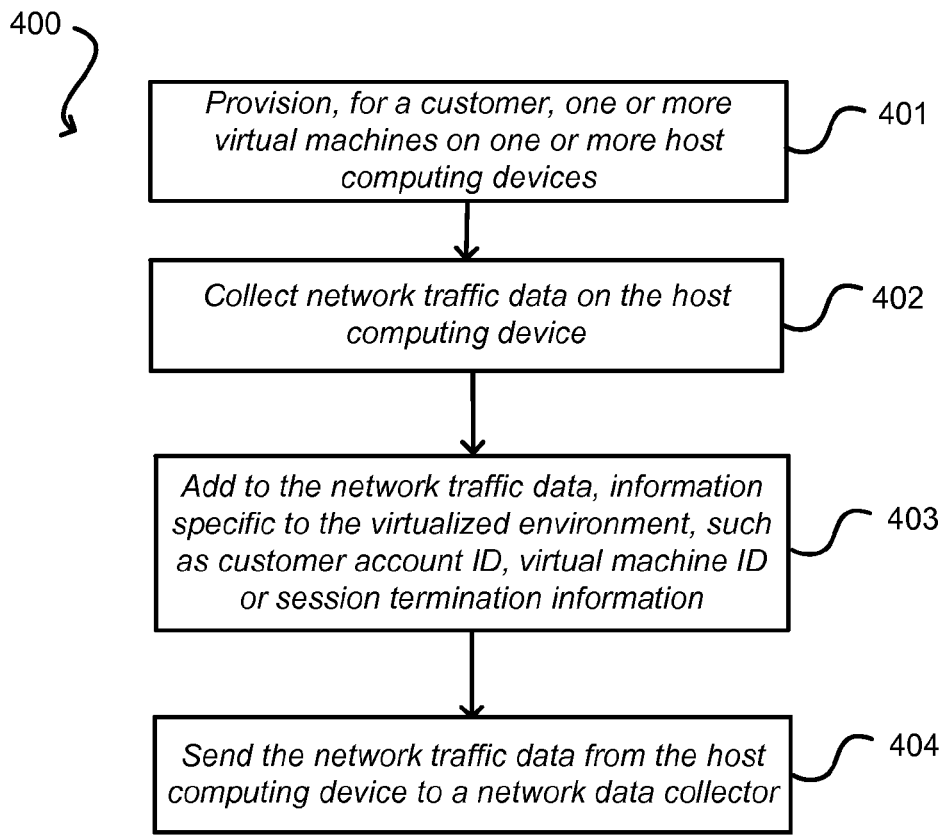
FIG. 4 illustrates an example process for collecting network traffic data in a multitenant virtualized computing environment, in accordance with various embodiments.

FIG. 4 illustrates an example process 400 for collecting network traffic data in a multitenant virtualized computing environment, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, one or more virtual machines are provisioned for a customer on one or more host computing devices. Each virtual machine can include a guest operating system and the virtual machine can be used to execute customer-provided code. In various embodiments, any virtualization technology can be used to implement the guest virtual machine on the host computing device. For example, a combination of a hypervisor and a DOM-0 can be used to manage the virtual machines on the host computing device.

In operation 402, network traffic data is collected on the host computing device. In various embodiments, the network traffic data can be comprised of one or more records that contain data for traffic flows being processed on the host computing device. The network traffic data can be collected by an agent residing in the virtualization layer of the host computing device. For example, an agent residing in the virtualization layer (e.g., DOM-0, hypervisor, etc.) of the host computing device may access the traffic after the traffic is processed by the backend network driver in order to analyze the packets emitted by the virtual machine executing on the host computing device. In at least some embodiments, the agent is able to read the memory that stores the packets before those packets are modified and sent over the physical network card (e.g., NIC). The agent may also inspect each packet to see if the packet includes a new source IP address and destination IP address combo and tag that packet as being part of a new flow.

In operation 403, information specific to the virtualized computing environment can be added to the network traffic data, such as customer account identifier information, virtual machine identifier information, and/or session termination information. In one embodiment, the agent collecting the network traffic can extend the network traffic data with this virtualized computing environment information at the time of collecting the data. Alternatively, the network data collector could add this information during the processing phase, after the network traffic data has been collected and stored. In an embodiment, the information that is added to the network traffic data (e.g., information specific to the virtualized computing environment) can be obtained from the hypervisor of the host computing device. In another embodiment, it can be obtained from a service (e.g., external distributed service) that directed the host computing device to launch the virtual machine.

In operation 404, the network traffic data is sent (e.g., exported) to a network data collector. In some embodiments, the network traffic data can first be collected on the host computing device and then be periodically exported from the host computing device to the network data collector. In other embodiments, the network traffic data can be streamed to the network data collector "live", i.e. as the network traffic data is being obtained on the host computing device. The network data collector can be any system or device that is external with respect to the host computing device. In one embodiment, the network traffic data is extended at the time of exporting the data to the network data collector. In another embodiment, the network traffic data is extended at the time of storing it on the host computing device.

Figure 5:
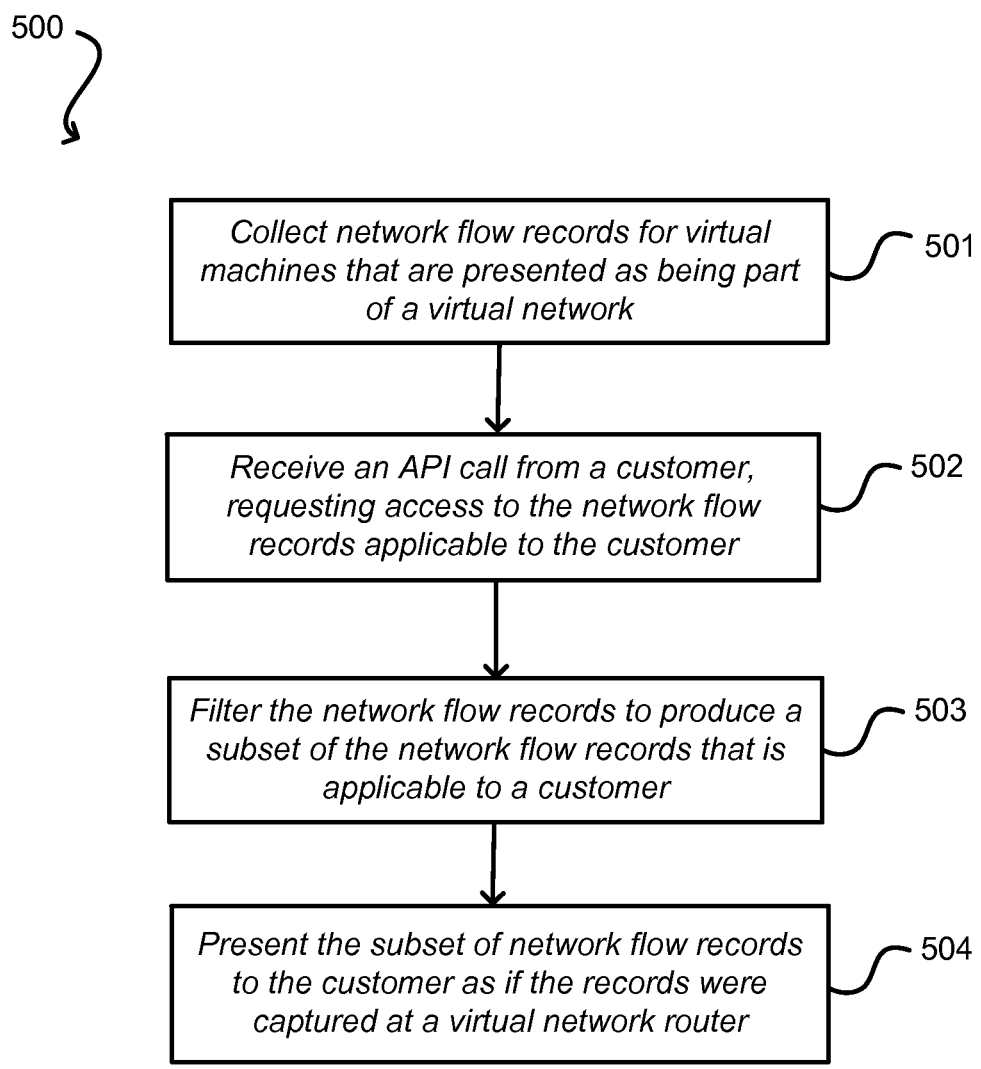
FIG. 5 illustrates an example process of presenting network traffic data to a customer of a service provider, in accordance with various embodiments.

FIG. 5 illustrates an example process 500 of presenting network traffic data to a customer of a service provider, in accordance with various embodiments. In operation 501, the service provider collects network traffic data for one or more virtual machines that are presented as being part of a virtual network. The data collection can be performed on each host computing device, as previously described. In one embodiment, the network traffic data is extended by adding information specific to the virtualized computing environment.

In operation 502, the customer submits a request (e.g., API call) to configure the network traffic data collection for the virtual machines that belong to the customer. Once the API call is received, the API call can be authenticated and authorized, such as by an identity access management service executing in the virtualized computing environment. Once the API call is authenticated/authorized, the API call can be routed to network data collection service, which may send a request to the appropriate host computing devices to start collecting the network traffic data. In one embodiment, the customer owns a virtual network provisioned in the virtualized environment and requests the network traffic data for their specific virtual network. In some embodiments, the API call can be submitted once to cause the service provider to start the collection of network traffic data for the virtual network and to store the collected data in a location accessible by the customer. In other embodiments, the access to the collected network traffic data can be made on a per API call basis, such that a customer may invoke an API call to retrieve a subset of network traffic data for a particular virtual machine, virtual network, period of time, etc.

In operation 503, the service provider filters all of the network traffic data collected across all host computing devices to produce a subset of the network traffic data that is applicable to the customer that submitted the request. For example, the network data collector may filter all the collected network traffic data records by customer ID that matches the identifier of the customer that submitted the API request. This would remove the network traffic data that is associated with other customers of the service provider. In one embodiment, the subset of the applicable network traffic data includes any IP packet traffic processed by (e.g., received by and/or transmitted by) each virtual machine that is owned by the customer.

In operation 504, the service provider presents the subset of the network traffic data to the customer. The service provider may present the information by transmitting the network traffic data back to the customer in response to an API call for it. For example, the API response could initiate a download of the network traffic data. In one embodiment, the subset of the network traffic data is made to appear as if it was collected by a physical network router connected to the virtual network of the customer. The customer can access the subset of the network traffic data and analyze it in order to obtain information about the traffic flowing through their network.

Figure 6:
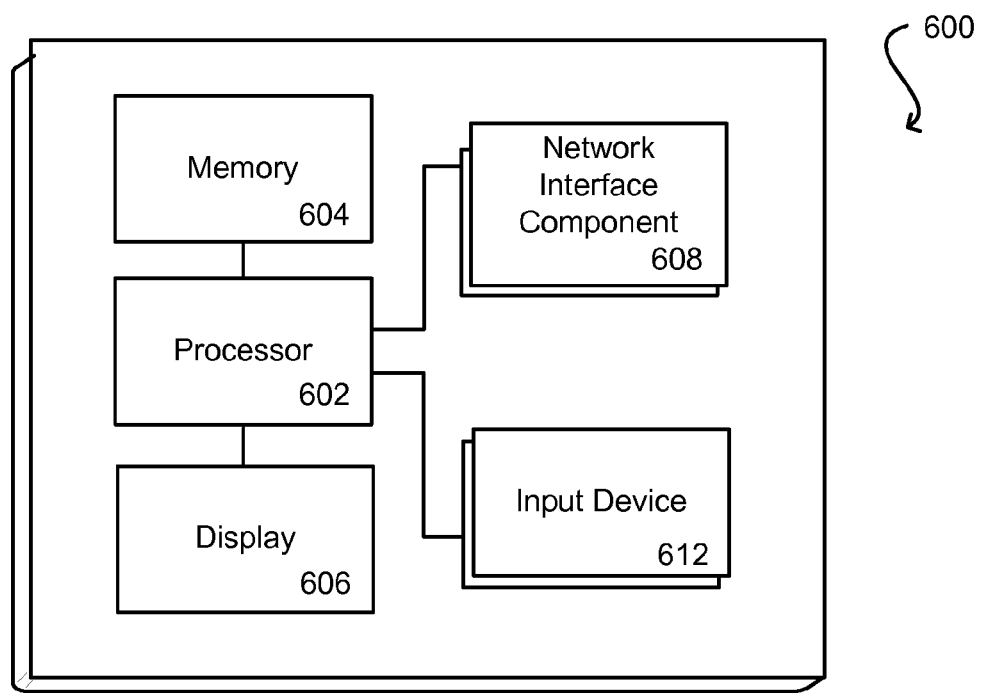
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
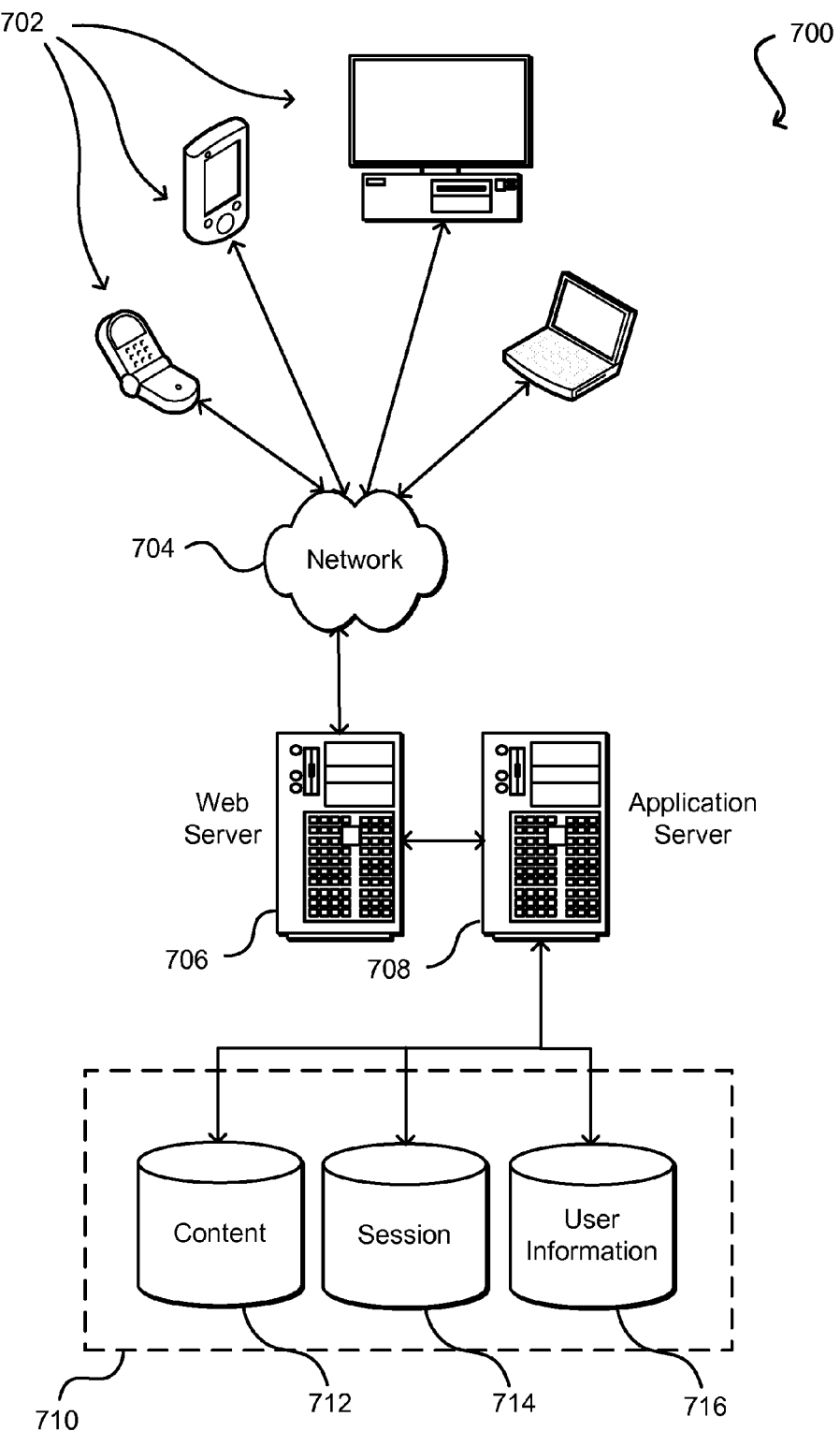
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for collecting data in a virtualized computing environment, said method comprising:

under the control of one or more computer systems configured with executable instructions, providing, by a host computing device operated by a service provider, a virtual machine instance associated with a customer, wherein the virtual machine instance is hosted on a virtualization layer of the host computing device and the virtualization layer comprises a hypervisor operating in combination with a privileged domain;

collecting, by an agent in the virtualization layer, network traffic data on the host computing device, the network traffic data including at least one record for each defined flow of network packets transmitted to or from the virtual machine instance on the host computing device;

inspecting one or more of the network packets for a new source IP address and destination IP address combination;

determining whether a new flow of network packets has begun, based on the inspection;

adding service provider information to the collected network traffic data, the service provider information including session termination information related to a reason for termination of the defined flow of the network packets executed on the host computing device; and sending the network traffic data from the host computing device to a network data collector that is external with respect to the host computing device.

2. The computer implemented method of claim 1, further comprising:

filtering the network traffic data based at least in part on the customer to produce a subset of the network traffic data related to one or more virtual machine instances owned by the customer; and providing the subset of the network traffic data for access by the customer by presenting the subset of the network traffic data as having been collected on a router device.

3. The computer implemented method of claim 1, further comprising:

analyzing the network traffic data exported to the network data collector by executing one or more queries based at least in part on the network traffic data.

4. The computer implemented method of claim 3, wherein analyzing the network traffic data further comprises:

identifying, based on results of the one or more queries, at least one of: a resource that has been configured incorrectly, or a malicious user.

5. A computer implemented method, comprising:

under the control of one or more computer systems configured with executable instructions, provisioning a virtual machine on a host computing device, the virtual machine associated with an account, wherein the virtual machine is hosted on a virtualization layer of the host computing device and the virtualization layer comprises a hypervisor operating in combination with a privileged domain;

collecting, by an agent in the virtualization layer, network traffic data related to one or more sequences of network packets transmitted on the host computing device, the network traffic data including at least information associated with a reason for termination of one or more sequences of the one or more sequences of network packets transmitted on the host computing device;

inspecting one or more of the network packets for a new source IP address and destination IP address combination;

determining whether a new flow of network packets has begun, based on the inspection; and providing at least a portion of the generated network traffic data to a user.

6. The computer implemented method of claim 5, wherein the host computing device is operated by a service provider and wherein the account is an account of a customer of the service provider.

7. The computer implemented method of claim 5, further comprising:

storing the generated network traffic data on the host computing device; and periodically exporting the stored network traffic data from the host computing device to a network data collector that is external with respect to the host computing device.

8. The computer implemented method of claim 7, further comprising:

executing one or more queries on the network traffic data in response to receiving at least one application programming interface (API) call over a network from a user.

9. The computer implemented method of claim 5, wherein generating the network traffic data further comprises:

generating information identifying a reason for terminating one or more sequences of network packets.

10. The computer implemented method of claim 9, further comprising:

adding to the network traffic data, information indicating at least one of: a normal session termination, a denial based at least in part on a policy of a service provider, a denial based at least in part on a security policy of a customer account, a throttling by abuse mitigation, or a throttling by denial of service (DOS) mitigation.

11. The computer implemented method of claim 5, further comprising:

filtering the network traffic data based at least in part on the customer to produce a subset of the network traffic data related to one or more virtual machines of the customer; and exposing the subset of the network traffic data to the customer by presenting the subset of the network traffic data in a format that corresponds to the format used by network router devices to store the network traffic data.

12. The computer implemented method of claim 11, wherein presenting the subset of the network traffic data in the format that corresponds to the format used by network router devices further comprises:

recording the identifier for the virtual machine in the ingress port field or the egress port field of a network flow record.

13. The computer implemented method of claim 5, wherein generating the network traffic data further comprises:

generating information identifying a virtual interface identifier, a virtual network of the customer account, a security group associated with the customer account, or one or more latency statistics.

14. A computer implemented method, comprising:

under the control of one or more computer systems configured with executable instructions, collecting a plurality of network flow records for virtual machines from one or more host computing devices, wherein each host computing device hosts one or more virtual machines on a respective virtualization layer associated with the host computing device and an agent in the respective virtualization layer of the host computing device collects the plurality of network flow records for the host computing device, wherein the virtualization layer comprises a hypervisor operating in combination with a privileged domain, and wherein the virtual machines are associated with a customer, and each network flow record is for a sequence of network packets transmitted to or from the one or more host computing devices and contains information associated with a reason for termination of the sequence of network packets;

inspecting one or more of the network packets for a new source IP address and destination IP address combination;

determining whether a new flow of network packets has begun, based on the inspection; and providing at least a portion of information from the network flow records for access to the customer.

15. The computer implemented method of claim 14, wherein providing at least the portion of the information from the network flow records further comprises:

providing the network flow records in a format that corresponds to the format used by network router devices to generate network flow records.

16. The computer implemented method of claim 14, further comprising:

receiving, from the customer, at least one application programming interface (API) call to configure the collecting of the plurality of network flow records for the customer; and initiating the collection of the network flow records in response to the API call.

17. The computer implemented method of claim 14, wherein collecting the plurality of network flow records further comprises:

adding information to the collected network flow records, the information identifying the virtual machines, an account associated with the customer, or one or more reasons for terminating the one or more sequences of network packets transmitted on the host computing device.

18. The computer implemented method of claim 14, wherein the virtual machines are part of a virtual network of the customer and the virtual network includes a virtual router.

19. The computer implemented method of claim 14, further comprising:

generating a virtual network device network flow record from information in the network flow records, wherein the virtual network device network flow record is formatted as having been collected by the virtual router of the virtual network.

20. The computer implemented method of claim 14, further comprising:

storing the network flow records collected on each of the one or more host computing devices in a file corresponding to the respective host computing device; and aggregating the network flow records in each file corresponding to the respective host computing device into a single network flow record file corresponding to the virtual network.

21. The computer implemented method of claim 14, further comprising:

receiving an invocation of at least one application programming interface (API) to retrieve the network flow records; and providing the subset of the network flow records for access to the customer in response to the invocation of the API.

22. A computing system, comprising:

at least one processor; and memory including instructions that, when executed by the at least one processor, cause the computing system to:

provision one or more virtual machines on a host computing device, each virtual machine associated with a customer account, the one or more virtual machines hosted on a virtualization layer of the host computing device, the virtualization layer comprising a hypervisor operating in combination with a privileged domain;

collect, by an agent in the virtualization layer, network traffic data related to one or more sequences of network packets transmitted on the host computing device;

inspect one or more of the network packets for a new source IP address and destination IP address combination;

determine whether a new flow of network packets has begun, based on the inspection; and add information to the collected network traffic data, the information identifying at least a reason for terminating the one or more sequences of network packets transmitted on the host computing device.

23. The computing system of claim 22, the memory further comprising instructions to cause the computing system to:

store the collected network traffic data into a data structure on the host computing device; and periodically export the stored network traffic data from the host computing device to a network data collector.

24. The computing system of claim 22, wherein the information identifying the reason for terminating the one or more sequences of network packets further comprises:

information indicating one of a normal session termination, a denial based at least in part on a policy of a service provider, a denial based at least in part on a security policy of the customer account, a throttling by abuse mitigation, or a throttling by denial of service (DOS) mitigation.

25. A non-transitory computer readable storage medium storing one or more sequences of instructions executable by one or more processors to cause a computing system to:

collect a plurality of network flow records from one or more host computing devices, each host computing device hosting one or more virtual machines on a respective virtualization layer comprising a hypervisor operating in combination with a privileged domain, wherein an agent in the respective virtualization layer of a host computing device collects at least a portion of the plurality of network flow records associated with the host computing device, and wherein each virtual machine is owned by a respective customer account, and each network flow record is associated with a defined sequence of network packets transmitted to or from the one or more host computing devices and contains information associated with a reason for termination of the defined sequence of network packets;

inspect one or more of the network packets for a new source IP address and destination IP address combination;

determine whether a new flow of network packets has begun, based on the inspection;

filter the plurality of network flow records to select a subset of the network flow records applicable to a customer; and provide the subset of the network flow records for access to the customer.

26. The non-transitory computer readable storage medium of claim 25, wherein providing the subset of the network flow records for access to the customer further comprises:

storing the subset of the network flow records in a format that corresponds to the format used by network router devices to store the network flow records.

27. The non-transitory computer readable storage medium of claim 25, wherein the customer is associated with at least one virtual network comprising a plurality of the virtual machines and a virtual router.

28. The non-transitory computer readable storage medium of claim 27, wherein the subset of network flow records is presented to the customer as having been collected by the virtual router of the virtual network.

29. The non-transitory computer readable storage medium of claim 25, further comprising instructions to cause the computing system to:
   receive an invocation of at least one application programming interface (API); and
   provide the subset of the network flow records for access to the customer in response to the invocation of the API.

* * * * *